United States Patent
Dinger et al.

(10) Patent No.: US 8,140,000 B2
(45) Date of Patent: Mar. 20, 2012

(54) CATEGORIZING AND SHARING LEARNING OBJECTS

(75) Inventors: Thomas J. Dinger, Sunnyvale, CA (US); Fernando Salazar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 2587 days.

(21) Appl. No.: 10/737,060

(22) Filed: Dec. 16, 2003

(65) Prior Publication Data

US 2005/0131849 A1    Jun. 16, 2005

(51) Int. Cl.
G09B 3/00 (2006.01)

(52) U.S. Cl. ......... 434/350; 434/322; 434/323; 434/362

(58) Field of Classification Search ............... 434/322, 434/323, 350, 362
See application file for complete search history.

(56) References Cited

U.S. PATENT DOCUMENTS

| | | | | |
|---|---|---|---|---|
| 5,860,068 A * | 1/1999 | Cook | | 705/26 |
| 5,956,715 A | 9/1999 | Glasser et al. | | |
| 5,978,648 A * | 11/1999 | George et al. | | 434/362 |
| 6,170,014 B1 * | 1/2001 | Darago et al. | | 709/229 |
| 6,282,573 B1 * | 8/2001 | Darago et al. | | 709/229 |
| 6,535,713 B1 * | 3/2003 | Houlihan et al. | | 434/350 |
| 6,606,664 B2 * | 8/2003 | Darago et al. | | 709/229 |
| 6,652,287 B1 * | 11/2003 | Strub et al. | | 434/365 |
| 6,685,478 B2 * | 2/2004 | Ho et al. | | 434/219 |
| 6,827,578 B2 * | 12/2004 | Krebs et al. | | 434/118 |
| 6,884,074 B2 * | 4/2005 | Theilmann | | 434/118 |
| 6,975,833 B2 * | 12/2005 | Theilmann et al. | | 434/350 |
| 6,978,115 B2 * | 12/2005 | Whitehurst et al. | | 434/350 |
| 6,988,138 B1 * | 1/2006 | Alcorn et al. | | 709/225 |
| 7,029,280 B2 * | 4/2006 | Krebs et al. | | 434/118 |
| 7,153,137 B2 * | 12/2006 | Altenhofen et al. | | 434/118 |
| 2002/0188583 A1 * | 12/2002 | Rukavina et al. | | 706/45 |
| 2004/0002039 A1 * | 1/2004 | Draper et al. | | 434/118 |
| 2004/0009462 A1 * | 1/2004 | McElwrath | | 434/350 |
| 2004/0096811 A1 * | 5/2004 | Anneswamy et al. | | 434/365 |
| 2004/0126750 A1 * | 7/2004 | Theilmann et al. | | 434/362 |
| 2004/0157193 A1 * | 8/2004 | Mejias et al. | | 434/118 |
| 2004/0191744 A1 * | 9/2004 | Guirguis | | 434/322 |
| 2005/0102322 A1 * | 5/2005 | Bagley et al. | | 707/104.1 |
| 2005/0112530 A1 * | 5/2005 | Dinger et al. | | 434/118 |

FOREIGN PATENT DOCUMENTS

JP    2002-323847    8/2002
WO   WO 01/01372 A1  4/2001

* cited by examiner

Primary Examiner — Kang Hu
(74) Attorney, Agent, or Firm — Steven M. Greenberg, Esq.; Carey, Rodriguez, Greenberg & O'Keefe LLP

(57) ABSTRACT

The present invention provides a method, system and computer program product for administering learning objects within a learning management system. In the invention, a learner can select various learning materials in the system, known as "learning objects", and can aggregate these learning objects in a special category or "learning folder" directly on the system. The learning folders can be separate from an existing course catalog of learning objects. Each learner can establish and delete learning folders, and can modify each learning folder by adding or removing learning objects to and from the folder. Finally, while each learning folder created by a user can at first only be accessed by the user, a user can allow other learners in the system to access the folder by establishing a "learning link" for the folder, which dictates which other learners can access the learning folder.

15 Claims, 2 Drawing Sheets

CATEGORIZING AND SHARING LEARNING OBJECTS

BACKGROUND OF THE INVENTION

1. Statement of the Technical Field

The present invention relates to the field of online learning management systems, and more particularly to the management and utilization of learning objects in a learning management system.

2. Description of the Related Art

A learning management system (LMS) can provide for the total management of an on-line learning experience—from content creation to course delivery. In the prototypical learning management system, one or more course offerings can be distributed about a computer communications network for delivery to students enrolled in one or more corresponding courses. The course offerings can include content which ranges from mere text-based instructional materials to full-blown interactive, live classroom settings hosted entirely through the computer communications network. So advanced to date has the ability of learning management systems to deliver content become, that nearly any learning experience formerly delivered through in-person instruction now can be delivered entirely on-line and even globally over the Internet.

The conventional learning management system can include a learning management server configured to manage the introduction and distribution of course materials to enrolled students. However, one common problem with large Learning Management Systems is that the amount of learning material can become so large that it is difficult for learners to find particular learning materials, or "learning objects." Also, once any appropriate learning object has been located, it can be difficult to relocate, or to direct another to locate, the same learning object.

LMS applications currently employ several types of mechanisms for finding and sharing learning objects, including: (i) catalog search facilities, (ii) recommended course lists, or (iii) enrolled course lists. However, there are shortcomings with regard to each such mechanism, insofar as providing quick, relatively easy, individualized access to specific learning objects.

A catalog search can be used as a general way to find specific learning objects, but the process must be repeated each time a learner wants to find the same object. In addition, the results of the search may include learning objects that are not of interest to the learner. A recommended course list provides quick access to a list of learning objects that may be of interest to the learner, but administrative action is required to setup the recommendations. An enrolled course list provides quick access to the specific learning objects for which a learner as enrolled, but is somewhat restrictive in that the learner has to enroll in the learning object to see it, which may not be desirable. Thus, LMS applications lack adequate mechanisms for finding and sharing learning objects.

It would be desirable therefore, to provide for a learning management system where a learner could easily find, assemble, manage, and share learning objects in an individualized manner.

SUMMARY OF THE INVENTION

The present invention addresses the deficiencies of the art with respect to finding, managing and sharing learning materials in a learning management system. The present invention provides a novel and non-obvious method and system for ad-hoc learner-based administration of learning materials in a learning management system. A user can select various learning materials in the system, known as "learning objects", and can aggregate these learning objects in a special category or "learning folder" directly on the system. The user can create and delete learning folders, and can modify each learning folder by adding or removing learning objects from the folder. Finally, while each learning folder created by a user can at first only be accessed by the user, a user can allow other learners on the system to access the folder by establishing a "learning link" for the folder, and specifying which other learners can access the learning folder.

The methods of the invention can be performed in the context of administering a learning management system. First a learning folder can be established for a learner on the learning management system. Next, one or more learning objects can be added to the learning folder. In addition, a learning link can be established for the learning folder, where the learning link provides access to the learning folder for one or more additional learners using the learning management system.

Systems consistent with the present invention include a learning management system having a plurality of learning objects. The system can be configured to establish a learning folder for a learner coupled to the learning management system. Furthermore, the system can be configured to add one or more learning objects from the plurality of learning objects to the learning folder. Finally, the system can be configured to establish a learning link for the learning folder. Each learning link can then provide access to the learning folder for one or more additional learners using the learning management system.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method and system for finding, managing and sharing learning materials in a learning management system. In accordance with the principles of the invention, a user of the learning management system, otherwise referred to as a "learner", can select from various learning materials in a learning management system, otherwise known as "learning objects." To be able to easily retrieve, manage, and share these materials, the learner can aggregate selected learning objects into an ad-hoc category or "learning folder", which is established on the learning management system. The learner can further create and delete learning folders, and can add or remove learning objects to and from the folder. Furthermore, a user can allow other learners on the system to access the folder by establishing a "learning link" for the folder. Each learning link can then specify which other learners can access the learning folder.

Figure 1:
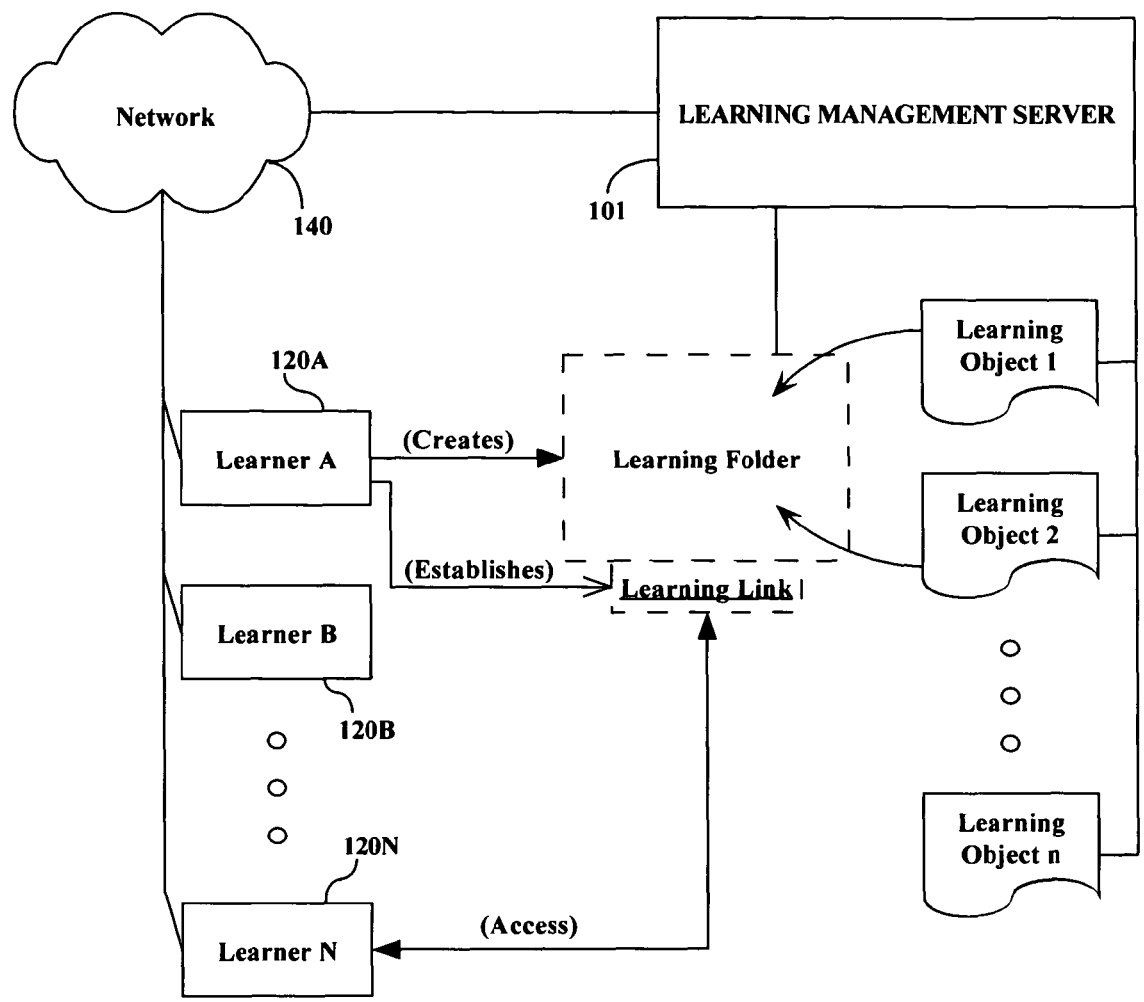
FIG. 1 is a schematic illustration of a learning management system configured for establishing and managing learning folders having learning objects selected by learners.

FIG. 1 is a schematic illustration of a learning management system configured for establishing and managing learning folders containing learning objects selected by learners. The learning management system can include a learning management server 101 coupled to one or more client computing devices 120A, 120B, 120N over a computer communications network 140. The learning management server 101 can include a database management system (not shown) to manage users, enrollments, learning objects, resources, etc. The learning management server 101 further can include reporting, calendaring, messaging and scheduling logic.

A number of users or learners are at any time coupled to the learning management system through the one or more client computing devices 120A, 120B, 120N. Any learner, such as Learner A, being a user of computing device 120A, can therefore connect to the learning management system server 101 and peruse through the various learning materials, or "learning objects" disposed throughout the system on server 101. As used herein, a "learning object" can be any entity that is used to facilitate learning. A learning object can therefore include any asset, activity, topic, course, certificate, curriculum, or other learning related item defined within the learning management system.

Learner A can for example, desire to aggregate certain learning objects in a learning folder. The learner can establish the learning folder on the server 101, and can then select one or more learning objects to be added to the folder. Alternatively, after a learner has already created a learning folder, the learner can remove any number of learning objects from the folder. Or, the user can delete the learning folder outright.

In the example shown in FIG. 1, Learner A has created a learning folder and has selected Learning Objects 1 and 2 to be placed in the folder. The present invention allows a learner to categorize a learning object within the learning management system in an ad-hoc fashion, and not based on any specific characteristic of the learning object, other than perhaps the fact that the learner is interested in it and wants to have a quick way of accessing it again. Thus, there need be no particular relationship between Learning Objects 1 and 2. Learner A can select and remove learning objects from the folder at will.

In addition, a learner can create and remove "learning links" that can be associated with a learning folder. As used herein, a "learning link" can be any functionality or implementation bestowed on a particular learning folder by a learner so as to allow certain other learners to access and use the learning folder. One way of implementing a learning link could be by specifying in an access control list who could view and/or manage the folder. In the example shown in FIG. 1, Learner A has established a learning link and dictated that Learner N has access to the folder. Alternatively, Learner A could have allowed all N learners on the system to access the folder, instead of limiting it to just one other learner.

Figure 2:
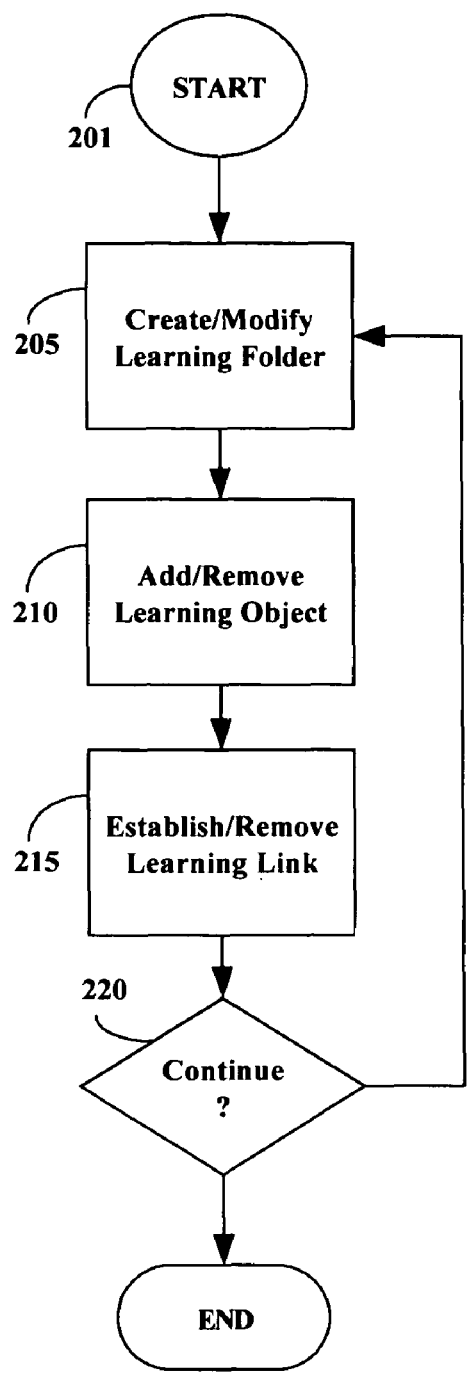
FIG. 2 is a flow chart of a process for establishing and managing learning folders in the learning management system of FIG. 1.

In more particular illustration, FIG. 2 is a flow chart of a process for establishing and managing learning folders in the learning management system of FIG. 1. Beginning with block 205, the process allows a learner to create or modify a learning folder. The learner can establish a new learning folder, or can delete an existing learning folder. In step 210, the learner can add or remove learning objects in any particular learning folder. And in step 215, the learner can establish or remove learning links for any learning folder already created, and can establish which groups of other learners can use such learning folders.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of administering learning objects within a learning management system, comprising the steps of:
   establishing by a particular learner within a computer system a learning folder for the particular learner in the learning management system (LMS) which is separate from an existing selection of learning objects, the learning folder comprising a configuration to aggregate access to learning objects from the separate existing selection of learning objects;
   adding by the particular learner within the computing system one or more of the learning objects to the learning folder;
   initially limiting access to the learning folder within the computing system to the particular learner;
   and, establishing a learning link for the learning folder, which provides access to the learning folder for one or more additional learners.

2. The method of claim 1, further comprising the steps of:
   modifying the learning folder by adding one or more additional learning objects to the learning folder.

3. The method of claim 1, further comprising the steps of:
   modifying the learning folder by removing one or more learning objects from the learning folder.

4. The method of claim 1, further comprising the steps of:
   modifying the learning link by adding access for one or more learners.

5. The method of claim 1, further comprising the steps of:
   modifying the learning link by removing access for one or more learners.

6. The method of claim 1, further comprising the steps of:
removing a learning folder from the learning management system.

7. The method of claim 1, further comprising the steps of:
removing a learning link from the learning management system.

8. A non-transitory machine readable storage having stored thereon a computer program for administering learning objects within a learning management system, the computer program comprising a routine set of instructions which when executed by the machine cause the machine to perform the steps of:
establishing by a particular learner within a computing system a learning folder for the particular learner in the learning management system (LMS) which is separate from an existing selection of learning objects, the learning folder comprising a configuration to aggregate access to learning objects from the separate existing selection of learning objects;
adding by the particular learner within the computing system one or more of the learning objects to the learning folder;
initially limiting access to the learning folder within the computing system to the particular learner;
and, establishing a learning link for the learning folder, which provides access to the learning folder for one or more additional learners.

9. The machine readable storage of claim 8, further causing said machine to perform the steps of:
modifying the learning folder by adding one or more additional learning objects to the learning folder.

10. The machine readable storage of claim 8, further causing said machine to perform the steps of:
modifying the learning folder by removing one or more learning objects from the learning folder.

11. The machine readable storage of claim 8, further causing said machine to perform the steps of:
modifying the learning link by adding access for one or more learners.

12. The machine readable storage of claim 8, further causing said machine to perform the steps of:
modifying the learning link by removing access for one or more learners.

13. The machine readable storage of claim 8, further causing said machine to perform the steps of:
removing a learning folder from the learning management system.

14. The machine readable storage of claim 8, further causing said machine to perform the steps of:
removing a learning link from the learning management system.

15. A learning management system (LMS) comprising:
a plurality of course materials amongst an existing selection of course materials disposed within a computing system;
a plurality of learners configured to access the course materials within the computing system;
a learning folder management user interface within the computing system through which particular ones of the learners establish learning folders, each of the learning folders aggregating selected ones of the course materials separate and apart from the existing selection of course materials disposed within the computing system;
the learning management user interface comprises a configuration for limiting access to each one of the established learning folders to the particular one or the learners who created the learning folder;
and, the learning management user interface further comprises a configuration for permitting access to selected ones of the established learning folders for other of the learners by way of corresponding learning links.

* * * * *